(12) United States Patent
Zhou et al.

(10) Patent No.: US 12,206,230 B2
(45) Date of Patent: Jan. 21, 2025

(54) POWER CABLE SYSTEM PREFABRICATED IN A BUILDING STRUCTURE

(71) Applicant: A&C Future Inc, Newport Beach, CA (US)

(72) Inventors: Zhuangboyu Zhou, Santa Ana, CA (US); Jiuqi Wang, Tustin, CA (US); Keguan Zou, Irvine, CA (US); Sichen Li, Irvine, CA (US); Han Qin, Newport Beach, CA (US); Jiayang Qin, Newport Beach, CA (US)

(73) Assignee: A&C Future Inc

( * ) Notice: Subject to any disclaimer, the term of this patent is extended or adjusted under 35 U.S.C. 154(b) by 306 days.

(21) Appl. No.: 17/946,979

(22) Filed: Sep. 16, 2022

(65) Prior Publication Data

US 2024/0097419 A1 Mar. 21, 2024

(51) Int. Cl.
*H02G 3/36* (2006.01)
*E04C 3/00* (2006.01)
*H02G 3/38* (2006.01)

(52) U.S. Cl.
CPC ........ *H02G 3/36* (2013.01); *E04C 3/00* (2013.01)

(58) Field of Classification Search
CPC ............. H02G 3/36; H02G 3/386; E04C 3/00
See application file for complete search history.

(56) References Cited

U.S. PATENT DOCUMENTS

| 5,609,006 A * | 3/1997 | Boyer | E04B 2/7457 52/309.7 |
| 10,273,687 B1 * | 4/2019 | Walker | E04B 2/7429 |
| 2006/0024996 A1 * | 2/2006 | Johnson | H02G 3/00 439/215 |
| 2009/0053926 A1 * | 2/2009 | Johnson | H02G 3/38 439/535 |
| 2010/0328853 A1 * | 12/2010 | Johnson | H02G 3/38 361/641 |
| 2011/0021050 A1 * | 1/2011 | Byrne | H02G 3/00 439/215 |
| 2012/0180411 A1 * | 7/2012 | Trimmer | E04B 1/16 52/794.1 |
| 2021/0246652 A1 * | 8/2021 | May | H02G 3/04 |
| 2021/0404183 A1 * | 12/2021 | May | E04B 2/58 |
| 2023/0358043 A1 * | 11/2023 | Marjaba | E04B 1/10 |
| 2024/0076872 A1 * | 3/2024 | May | E04B 2/58 |

* cited by examiner

*Primary Examiner* — Hoa C Nguyen
*Assistant Examiner* — Amol H Patel
(74) *Attorney, Agent, or Firm* — Elizabeth Yang

(57) ABSTRACT

The present invention provides a power cable system prefabricated in a building structure, the building structure contains at least one floor, and each floor has at least one starting column, a plurality of main beams and a plurality of auxiliary beams, the main beams are connected with the starting column, and the auxiliary beams are respectively connected with the main beams and the starting column; wherein main wires, first secondary wires, second secondary wires, and third secondary wires are correspondingly prefabricated on the starting column, the main beams, and the auxiliary beams respectively. Through those structure, the workers can quickly construct a power cable system while construct the beam-column system, which can significantly improve the construction efficiency.

10 Claims, 8 Drawing Sheets

POWER CABLE SYSTEM PREFABRICATED IN A BUILDING STRUCTURE

FIELD OF THE INVENTION

The present invention relates generally to beam-to-column system in a building structure, and more particularly, the present invention relates to a power cable system prefabricated in a building structure, which effectively improves the traditional building process by optimizing the way of installation of wires in the building to shorten the total building time.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

In the housing industry, the process of building a home is tedious and time-consuming. Especially in the process of construction, it is necessary to consider how the wires should be pulled so that each room has an adequate source of power. And once the wires are not pulled properly, they need to be removed and re-pulled, which creates additional cost and also waste much time. If the time of pulling the wires and designing wire routing plans can reduce, then the building expenses and time will be greatly reduced.

Therefore, how to quickly and efficiently reduce the time for wire constructions is the main problem that the applicant wants to solve.

SUMMARY

In order to solve the problem above, the present invention redefines the way of constructing wires by prefabricating the wires on the beams and columns. Furthermore, the prefabricated wires have unique arrangements to allow the worker to connect the wires directly when installing the beams and columns to speed up the construction of the building.

It is therefore an object of the present invention to provide building frames, like beams and columns, that can be mass-produced in a factory by a manufacturer to have wire prefabricated on them.

It is another object of the present invention to provide a new way of processing building floors.

It is yet another object of the present invention to provide an improved traditional way of building houses, thereby increasing the efficiency of building houses.

To achieve the objects above, the present invention provides a power cable system prefabricated in a building structure, the building structure contains at least one floor, and each floor has at least one starting column, a plurality of main beams and a plurality of auxiliary beams, the main beams are connected with the starting column, and the auxiliary beams are respectively connected with the main beams and the starting column, comprising:

the starting column has an electrical box and main wires, the main wires are connected to a power supply device, and the main wires will additionally form a plurality of first secondary wires after passing through the electrical box, and correspondingly form a first port on the two sides of the starting column respectively, and the main wire will continue to extend to another floor;

the main beams are arranged perpendicular to the starting column, and each of the main beams has a second secondary wires, which has two first connectors and a plurality of second ports, the first connectors are arranged at both ends of the second secondary wires for connecting with the first ports to connect the second secondary wires and the first secondary wires, and the second ports are arranged on the second secondary wires at intervals; and the auxiliary beams are arranged perpendicular to the starting column or the main beams, and each of the auxiliary beams has a third secondary wires, which has a second connector located on one end of the third secondary wires for connecting with the second ports to connect the third secondary wires and the second secondary wires, and bottom surface of the auxiliary beams is provided with a plurality of sockets, and the sockets are electrically connected to the third secondary wires;

wherein, the main wires, the first secondary wires, the second secondary wires, and the third secondary wires are correspondingly prefabricated on the starting column, the main beams, and the auxiliary beams respectively.

In another aspect, wherein the first secondary wires, the second secondary wires and the third secondary wires each have six wires.

In another aspect, wherein the second ports are formed extending vertically upward from the second secondary wires.

In another aspect, wherein the main beams have a baffle, and the baffle is provided with a plurality of connecting holes to correspond to the positions where the second ports are exposed.

In another aspect, wherein the sockets have six holes on the back for connecting the sockets with any one of the six wires of the third secondary wires.

In some embodiments, the present invention further designs, on the same auxiliary beam, the wires in the third secondary wires connected to each socket will not be the same.

In other embodiments, the present invention further designs all sockets on each of the auxiliary beams are connected to the same wire in the third secondary wires.

In other similar embodiments, the wire in the third secondary wires connected to all sockets on any one auxiliary beam will not be the same as the wire in the third secondary wires connected to all sockets on other auxiliary beams.

In another aspect, wherein each of the first secondary wires and the first port corresponding to the first secondary wires are located on the opposite side.

The present invention contains power cable system with prefabricated utilities, and beams-columns connections. The design optimizes the way of installation of connections between the wires on the beams and the columns during the construction of building. Once the beams and columns are built and connected, the wires are simply plug in by the ports and the connectors to complete the wire constructions.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
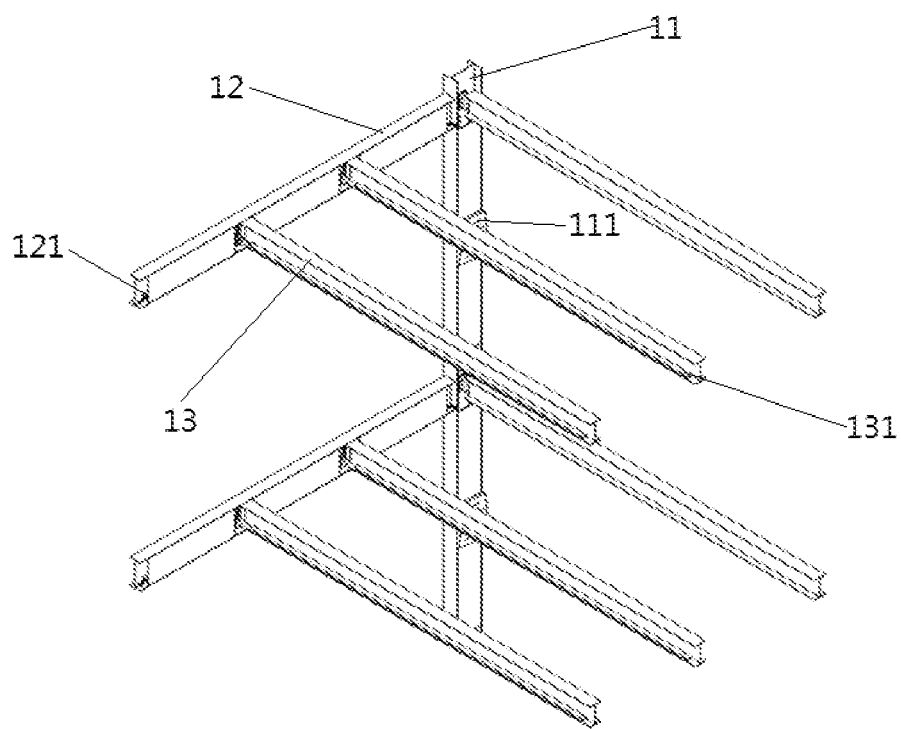
FIG. 1 illustrates the schematic view of an assembled building structure with prefabricated power cable system.
Figure 2A:
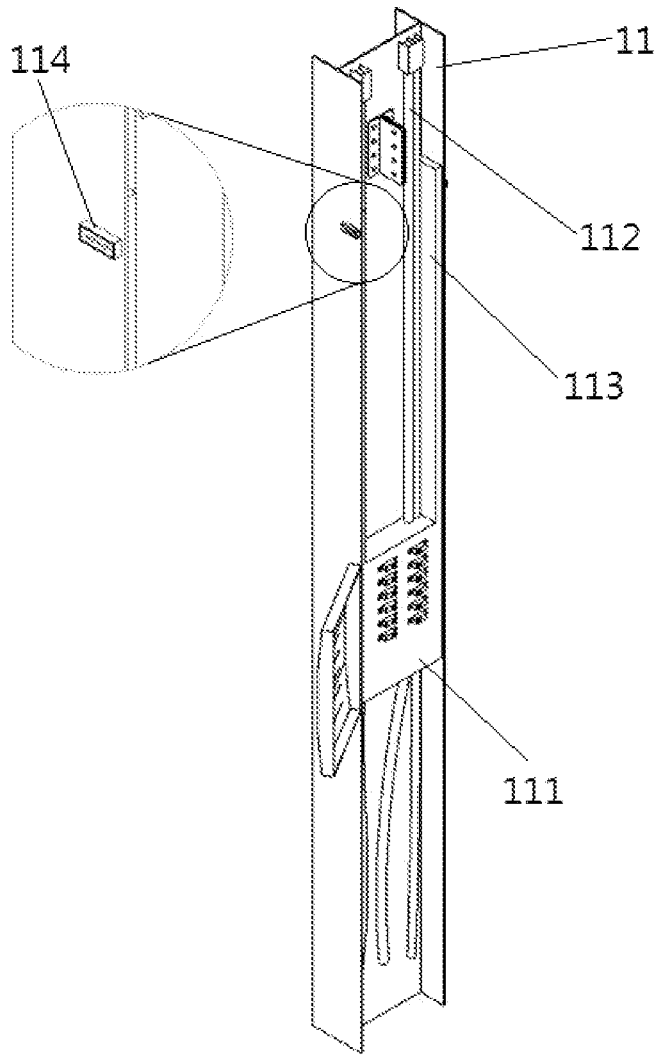
FIGS. 2A and 2B illustrate the schematic views of the starting column.
Figure 2B:
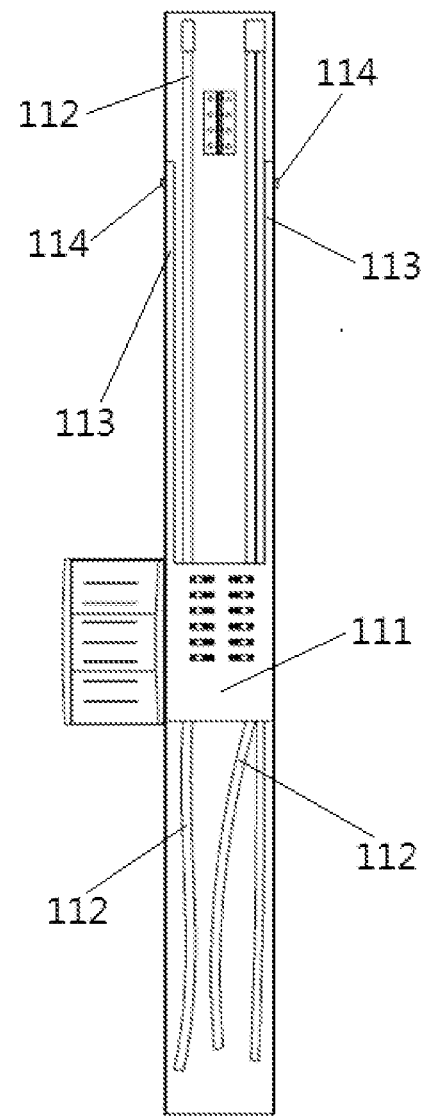

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Please refer to FIGS. 1-9, it illustrates the schematic view of an assembled building structure with prefabricated power cable system and the detailed components that is needed to build the present invention. In the present invention, a power cable system prefabricated in a building structure, the building structure contains at least one floor, and each floor has at least one starting column 11, a plurality of main beams 12 and a plurality of auxiliary beams 13, the main beams 12 are connected with the starting column 11, and the auxiliary beams 13 are respectively connected with the main beams 12 and the starting column 11. In detail, the starting column 11 has an electrical box 111 and main wires 112, the main wires 112 are connected to a power supply device (not shown), and the main wires 112 will additionally form a plurality of first secondary wires 113 after passing through the electrical box 111, and correspondingly form a first port 114 on the two sides of the starting column 11 respectively, and the main wires 112 will continue to extend to another floor. The main beams 12 are arranged perpendicular to the starting column 11, and each of the main beams 12 has a second secondary wires 121, which has two first connectors 122 and a plurality of second ports 123, the first connectors 122 are arranged at both ends of the second secondary wires 121 for connecting with the first ports 114 to connect the second secondary wires 121 and the first secondary wires 113, and the second ports 123 are arranged on the second secondary wires 121 at intervals. And, the auxiliary beams 13 are arranged perpendicular to the starting column 11 or the main beams 12, and each of the auxiliary beams 13 has a third secondary wires 131, which has a second connector 132 located on one end of the third secondary wires 131 for connecting with the second ports 123 to connect the third secondary wires 131 and the second secondary wires 121, and bottom surface of the auxiliary beams 13 is provided with a plurality of sockets 133, and the sockets 133 are electrically connected to the third secondary wires 131.

What is important is that the main wires 112, the first secondary wires 113, the second secondary wires 121, and the third secondary wires 131 are correspondingly prefabricated on the starting column 11, the main beams 12, and the auxiliary beams 13 respectively. Through such a structural design and prefabricated wiring, the workers can complete the power cable system of each floor together when constructing the beam-column system of the building, and the construction time can be reduced through a simple plug-in operation when dealing with the power cable system.

Figure 3:
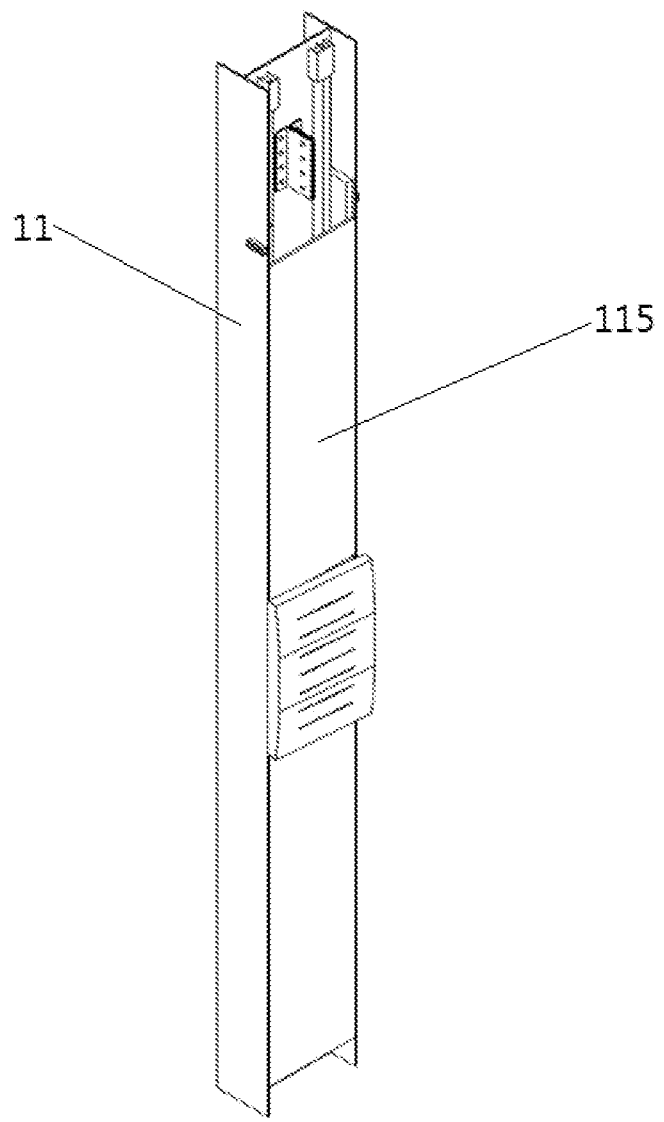
FIG. 3 illustrates the schematic view of the starting column in another embodiment.
Figure 4:
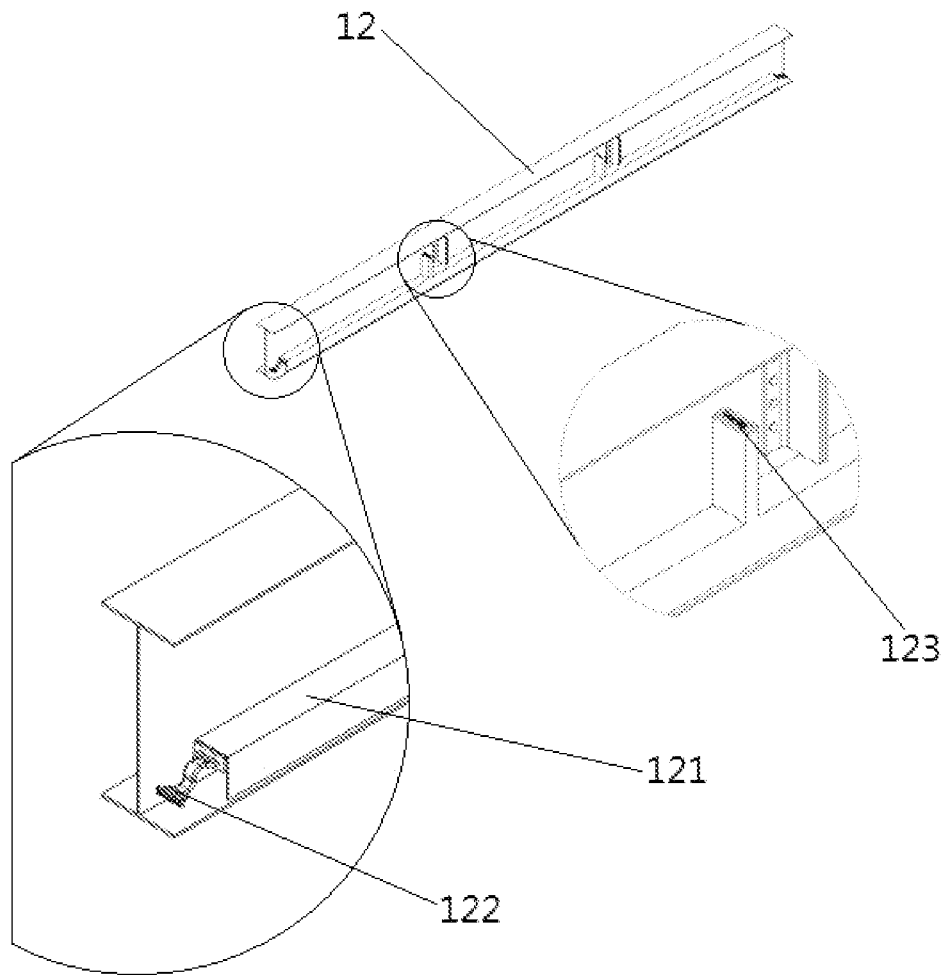
FIG. 4 illustrates the schematic view of the main beam.
Figure 5:
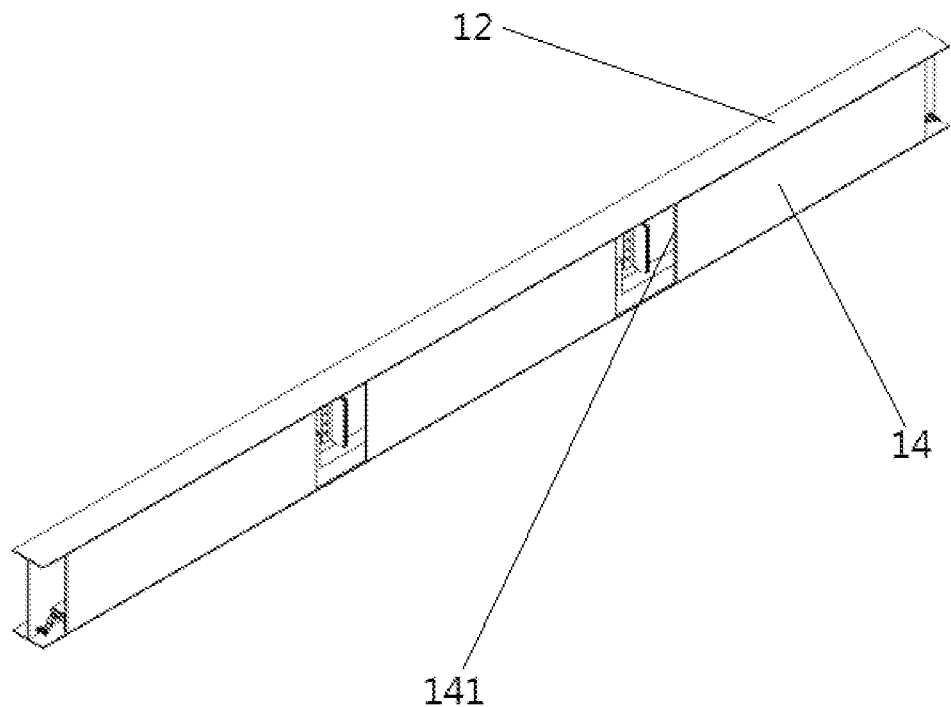
FIG. 5 illustrates the schematic view of the main beam with the baffle.
Figure 6:
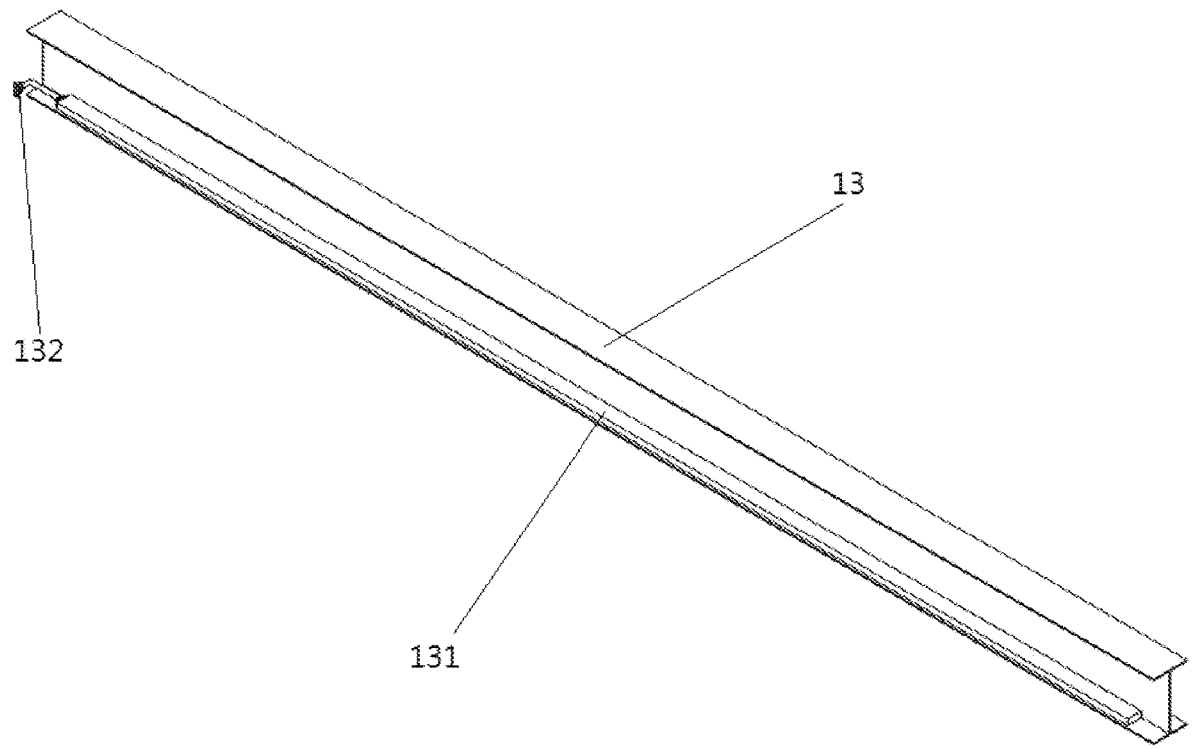
FIG. 6 illustrates the schematic view of the auxiliary beam.
Figure 7:
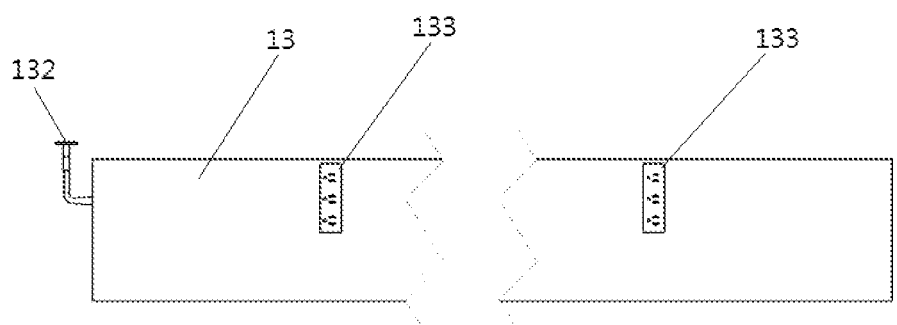
FIG. 7 illustrates the bottom view of the auxiliary beam.
Figure 8:
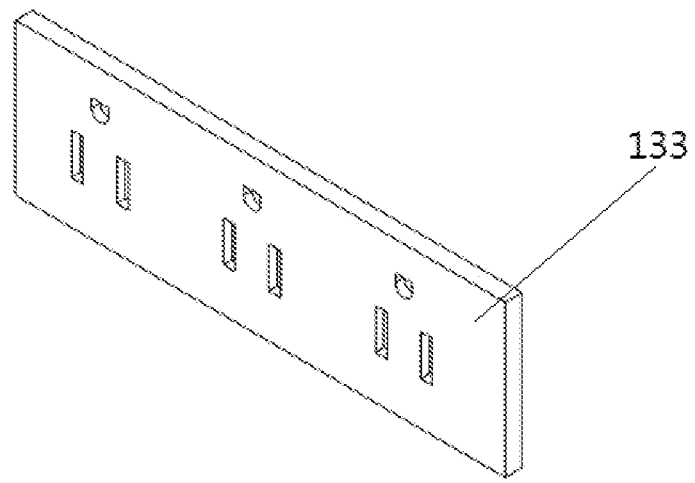
FIG. 8 illustrates the schematic view of the socket.
Figure 9:
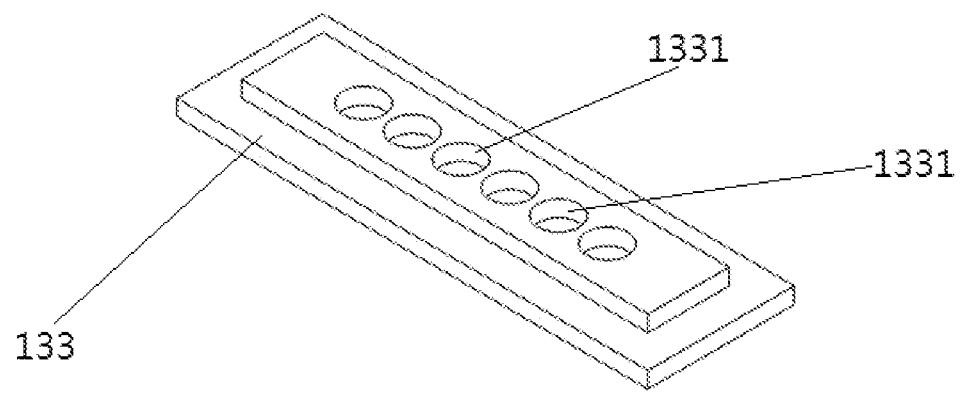
FIG. 9 illustrates the schematic view of another side of the socket.

In detail, in addition to the electrical box 111 prefabricated on the starting column 11, there is also a circuit breaker (not shown in the drawings), and in some embodiments, the starting column 11 can also be provided with a shutter 115 to cover the main wires 112 and the first secondary wires 113 to achieve the effect of beautification, as shown in FIG. 3. When the main wires 112 come out of the electrical box 111, the first secondary wires 113 are branched to the left and right, and each of the first secondary wires 113 has 6 wires. These wires are connected to the position where the starting column 11 is connected to the main beams 12 or the auxiliary beams 13, and the first ports 114 are provided on those locations. It can also be seen from the figures that each of the first secondary wires 113 and the first port 114 corresponding to the first secondary wires 113 are located on the opposite side. This increases the convenience when connecting. These first ports 114 (and the second ports 123 mentioned later) are specially designed to connect the six wires with the first connectors 122 (and the second connectors 132). In addition, the main beams 12 are also preset with the second secondary wires 121 and the first connectors 122. After the main beams 12 are connected to the starting column 11, the worker only needs to plug the first connectors 122 into the first ports 114 to form an electrical path with the first secondary wires 113 on the starting column 11. Furthermore, the third secondary wires 131 and the second connectors 132 are correspondingly provided on the auxiliary beams 13 connected to the main beams 12 or starting column 11. As described above, after the beam-column frame is constructed, it is only necessary to insert these corresponding connectors to the ports, so that all wires can be connected to each other and form a complete electrical path. Of course, the second secondary wires 121 and the third secondary wires 131 have 6 wires respectively, and the first ports 114, the second ports 123, the first connectors 122 and the second connectors 132 also correspond to the design of the 6 wires, and formed special structures as shown in the drawings. In addition, the 6 wires can also ensure the stability of the power supply of the whole building. And, the first connectors 122 and the second connectors 132 can have the same configuration.

Furthermore, regarding the main beams 12, in order to make the second secondary wires 121 easier to connect with the third secondary wires 131, the present invention not only arranges the second ports 123 in the vicinity of the location where the main beam 12 and the auxiliary beam 13 are connected, but also extends the second ports 123 vertically upward for a certain distance, so that the second connectors 132 on the auxiliary beams 13 can be easily inserted into the second ports 123. The present invention also designs a baffle 14 on the main beams 12, and the baffle 14 is provided with a plurality of connecting holes 141 to correspond to the positions where the second ports 123 are exposed. In this way, the main beams 12 can be more beautiful, and at the same time, it can also avoid fragmentary objects such as debris to hit and affect the transmission quality of the wires during construction.

Regarding the auxiliary beam 13, the sockets 133 on the auxiliary beam 13 have six holes 1331 on the back for connecting the sockets 133 with any one of the six wires of the third secondary wires 131. In detail, according to the needs of the construction, workers can convert one of the six wires into three regular sockets (per a socket set 133). For example, if a room needs wire A, then a converter A (not shown) is installed on the auxiliary beam 13, and the wire A among the six wires can be converted into three sockets (per a socket set 133), and if another room needs wire B, then install converter B (not shown) on the auxiliary beam 13. In this embodiment, there are a total of 6 kinds of converters corresponding to 6 wires, but the number of converters can be changed according to the number of wires, which is not limited thereto. Similarly, there are currently 5 socket sets 133 on each auxiliary beam 13, and the number can also be changed according to the length of the auxiliary beam 13 and the layout of the room, but is not limited to this.

In this embodiment, on the same auxiliary beam 13, the wires in the third secondary wires 131 connected to each socket set 133 will not be the same. Such a wire design can reduce the burden on each of the six wires, thereby increasing the durability of the present invention. In other embodiments, the present invention is designed such that all sockets 133 on each of the auxiliary beams 13 are connected to the same wire in the third secondary wires 131, and the wire in the third secondary wires 131 connected to all sockets 133 on any one auxiliary beam 13 will not be the same as the wire in the third secondary wires 131 connected to all sockets 133 on other auxiliary beams 13. In this way, workers are less likely to make mistakes during installation, and each auxiliary beam 13 uses different wires, which can also reduce the installation time, thereby improving the practicability of the present invention.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A power cable system prefabricated in a building structure, the building structure contains at least one floor, and each floor has at least one starting column, a plurality of main beams and a plurality of auxiliary beams, the main beams are connected with the starting column, and the auxiliary beams are respectively connected with the main beams and the starting column, comprising:
   the starting column has an electrical box and main wires, the main wires are connected to a power supply device, and the main wires will additionally form a plurality of first secondary wires after passing through the electrical box, and correspondingly form a first port on the two sides of the starting column respectively, and the main wire will continue to extend to another floor;
   the main beams are arranged perpendicular to the starting column, and each of the main beams has a second secondary wires, which has two first connectors and a plurality of second ports, the first connectors are arranged at both ends of the second secondary wires for connecting with the first ports to connect the second secondary wires and the first secondary wires, and the second ports are arranged on the second secondary wires at intervals; and
   the auxiliary beams are arranged perpendicular to the starting column or the main beams, and each of the auxiliary beams has a third secondary wires, which has a second connector located on one end of the third secondary wires for connecting with the second ports to connect the third secondary wires and the second secondary wires, and bottom surface of the auxiliary beams is provided with a plurality of sockets, and the sockets are electrically connected to the third secondary wires;
   wherein, the main wires, the first secondary wires, the second secondary wires, and the third secondary wires are correspondingly prefabricated on the starting column, the main beams, and the auxiliary beams respectively.

2. The power cable system prefabricated in a building structure of claim 1, wherein the first secondary wires, the second secondary wires and the third secondary wires each have six wires.

3. The power cable system prefabricated in a building structure of claim 2, wherein the second ports are formed extending vertically upward from the second secondary wires.

4. The power cable system prefabricated in a building structure of claim 3, the main beams have a baffle, and the baffle is provided with a plurality of connecting holes to correspond to the positions where the second ports are exposed.

5. The power cable system prefabricated in a building structure of claim 4, wherein the sockets have six holes on the back for connecting the sockets with any one of the six wires of the third secondary wires.

6. The power cable system prefabricated in a building structure of claim 5, wherein on the same auxiliary beam, the wires in the third secondary wires connected to each socket will not be the same.

7. The power cable system prefabricated in a building structure of claim 6, wherein each of the first secondary wires and the first port corresponding to the first secondary wires are located on the opposite side.

8. The power cable system prefabricated in a building structure of claim 5, wherein all sockets on each of the auxiliary beams are connected to the same wire in the third secondary wires.

9. The power cable system prefabricated in a building structure of claim 8, wherein the wire in the third secondary wires connected to all sockets on any one auxiliary beam will not be the same as the wire in the third secondary wires connected to all sockets on other auxiliary beams.

10. The power cable system prefabricated in a building structure of claim 9, wherein each of the first secondary wires and the first port corresponding to the first secondary wires are located on the opposite side.

\* \* \* \* \*